June 21, 1949.   C. E. HUSTON   2,473,587
HARVESTER FOR PACKING LETTUCE,
CABBAGE, CELERY AND THE LIKE
Filed Nov. 26, 1946   7 Sheets-Sheet 1
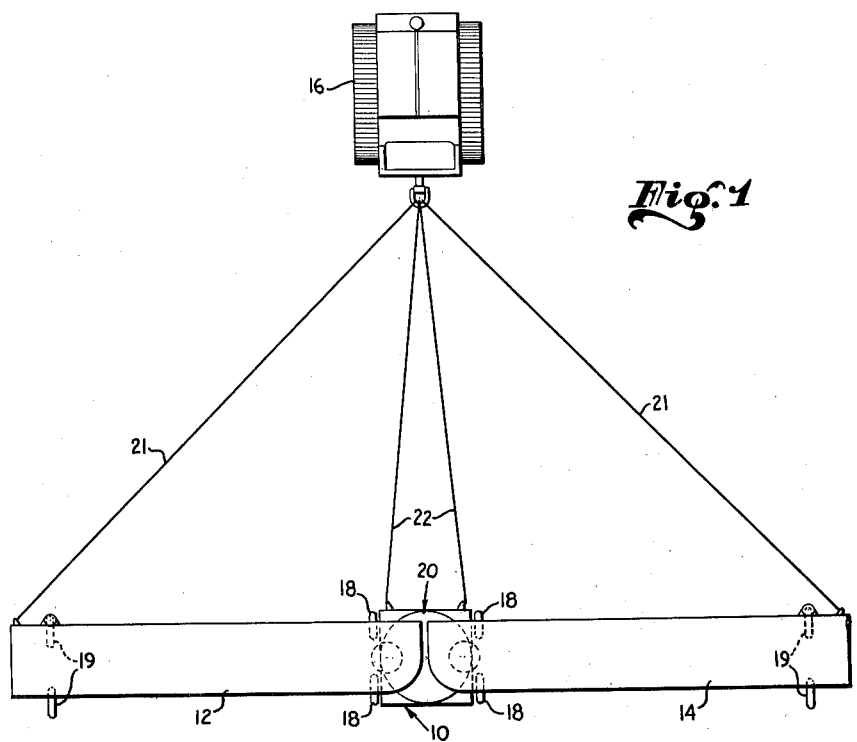
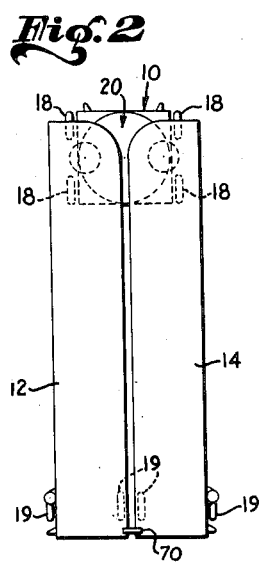
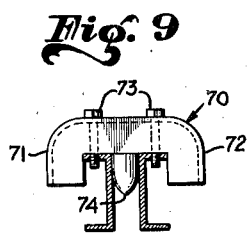
INVENTOR.
CHARLES E. HUSTON.
BY *Huebner, Maltby
and Beehler*
ATTORNEYS.

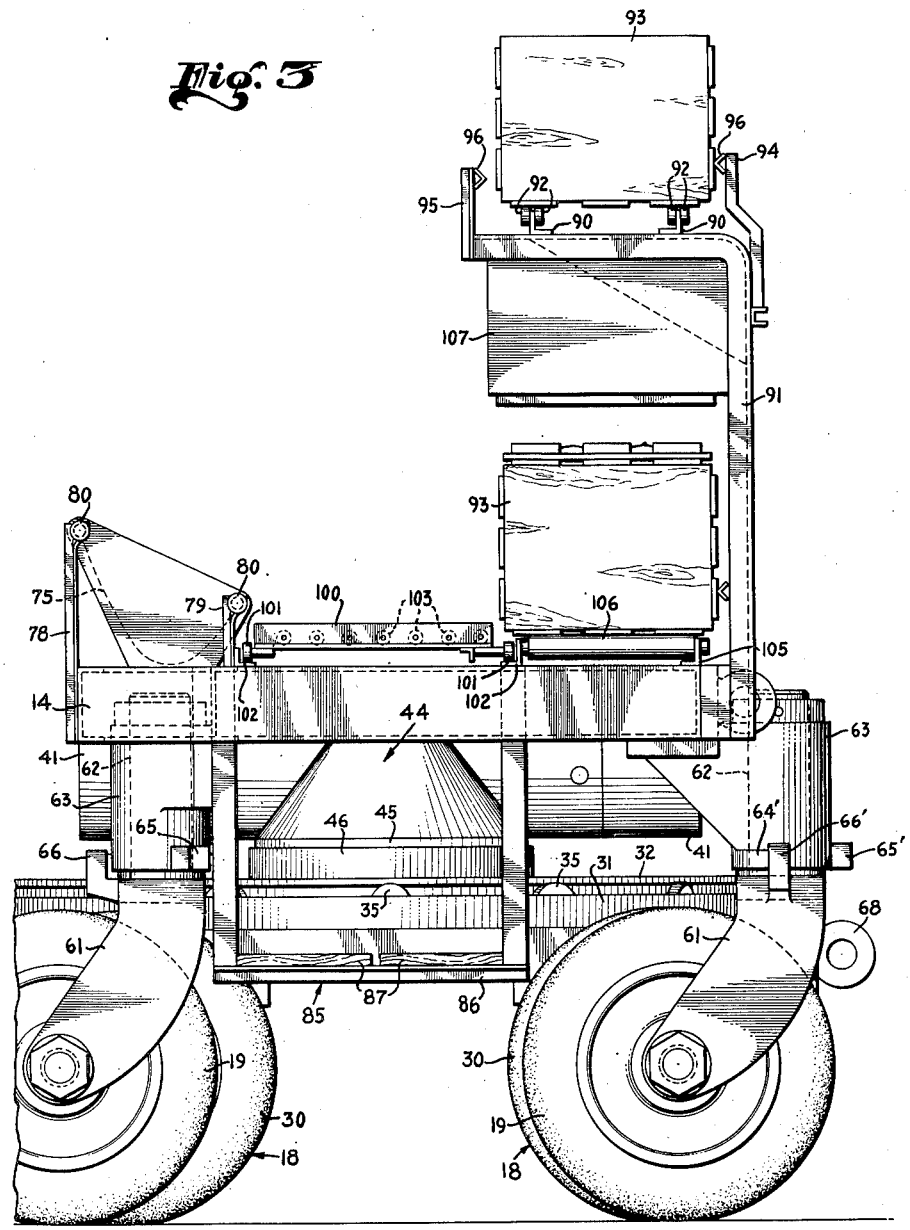

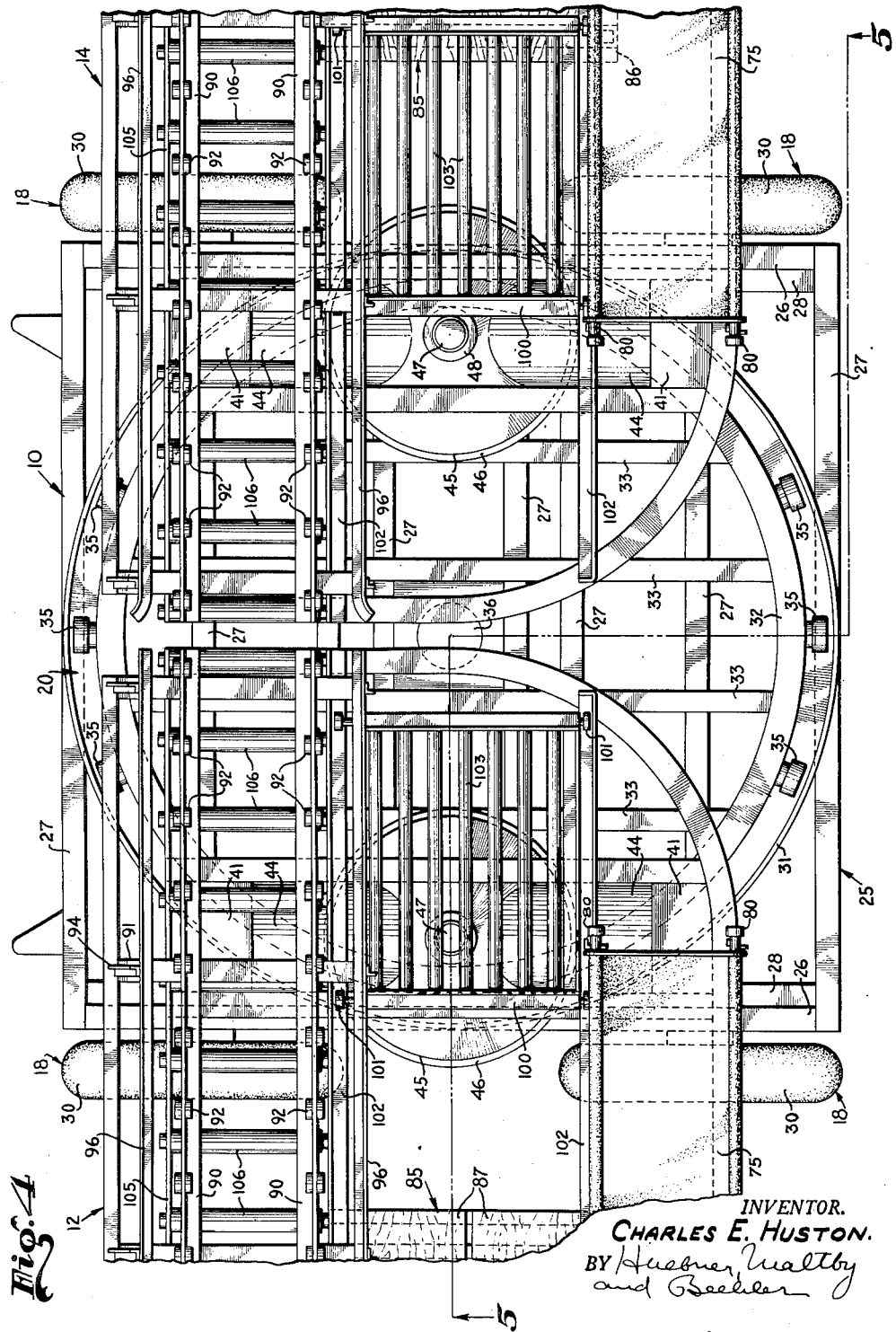

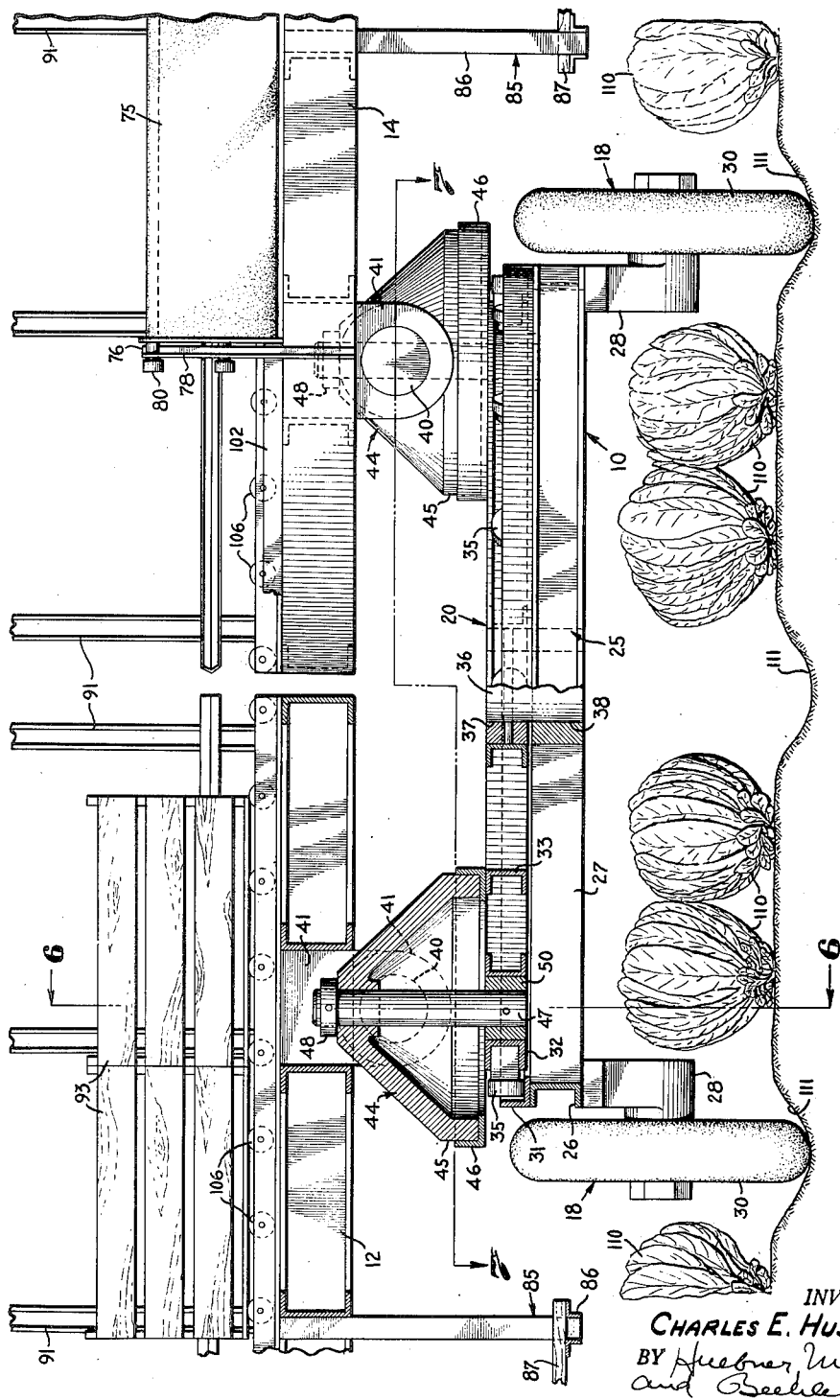

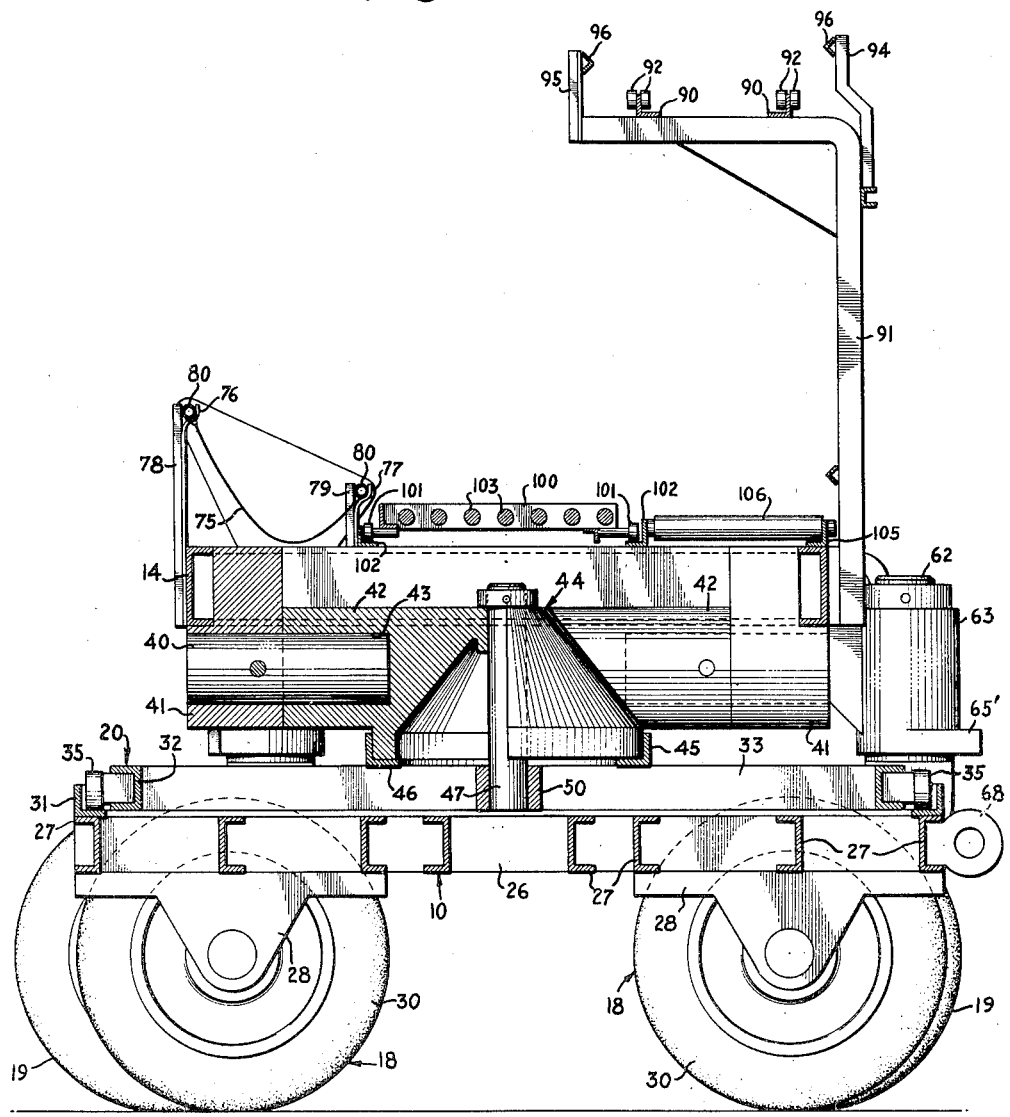

June 21, 1949.　　　　C. E. HUSTON　　　　2,473,587
HARVESTER FOR PACKING LETTUCE,
CABBAGE, CELERY AND THE LIKE
Filed Nov. 26, 1946　　　　　　　　　　　7 Sheets-Sheet 6
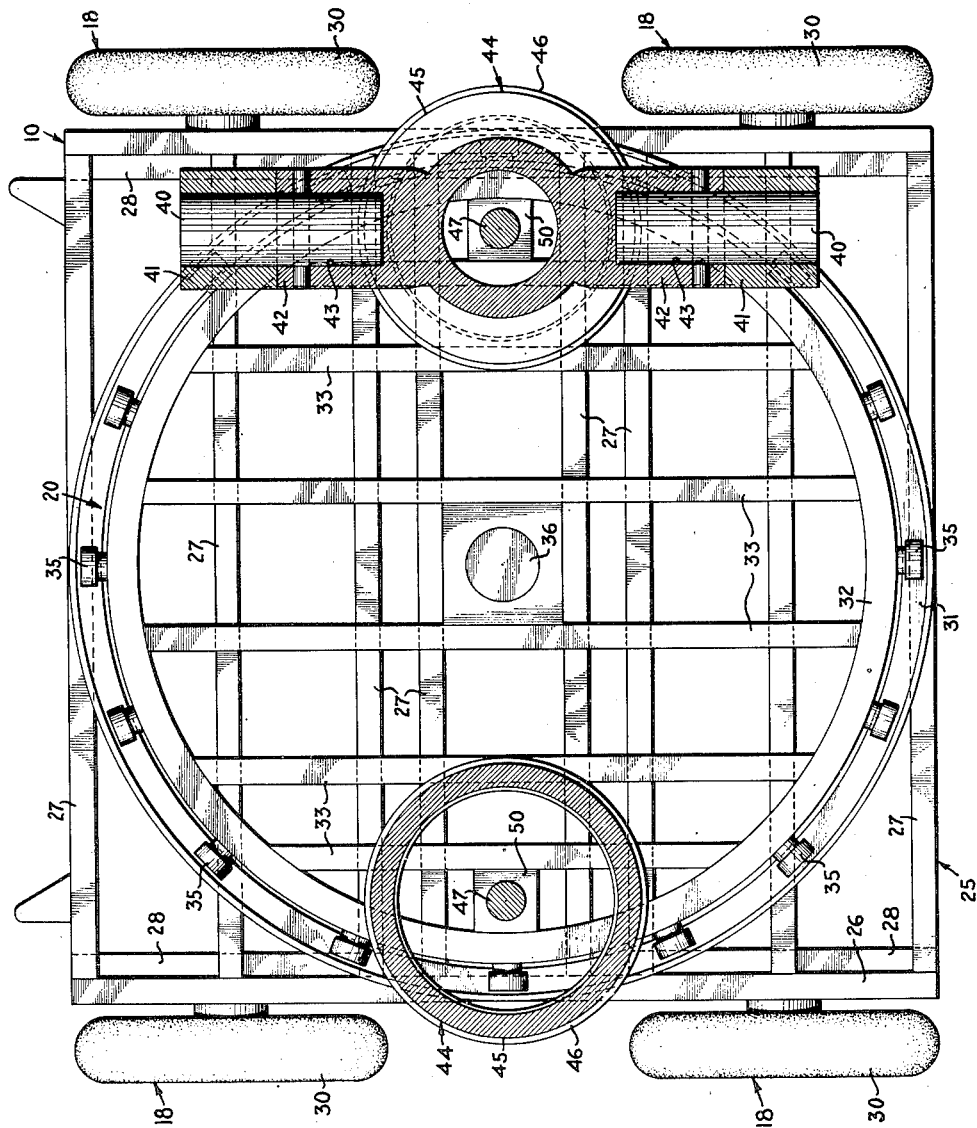
INVENTOR.
CHARLES E. HUSTON.
BY Huebner, Maltby
and Beehler
ATTORNEYS.

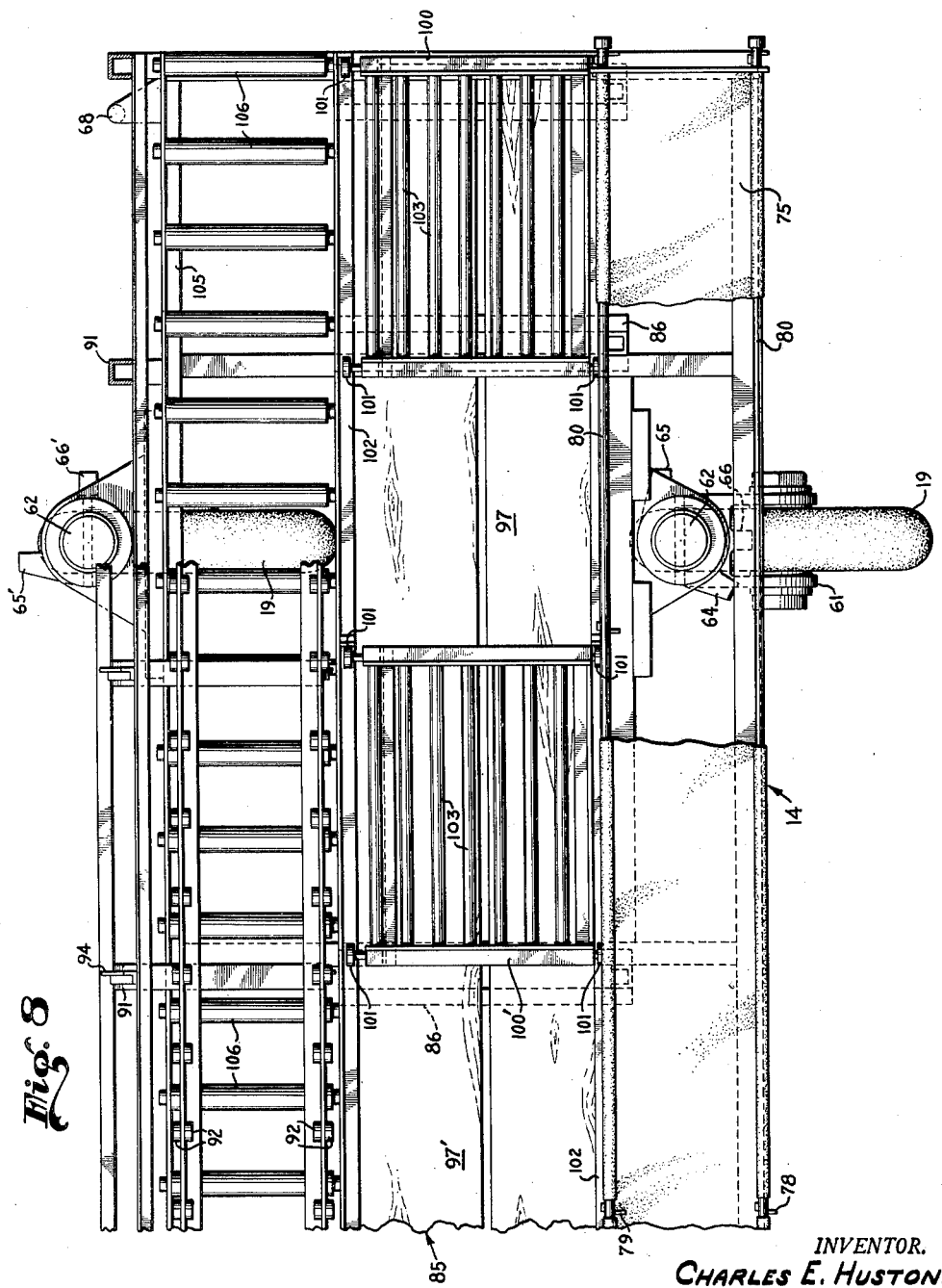

Patented June 21, 1949

2,473,587

UNITED STATES PATENT OFFICE 2,473,587

HARVESTER FOR PACKING LETTUCE, CABBAGE, CELERY, AND THE LIKE

Charles E. Huston, San Marino, Calif.

Application November 26, 1946, Serial No. 712,302

9 Claims. (Cl. 214—83.1)

The invention relates to a traveling apparatus for packing lettuce, cabbage, celery and other low growing crops, the apparatus being one which can be drawn through the fields and the packing accomplished en route.

In agricultural areas such as the large lettuce growing sections of California and Arizona the business of growing such vegetables as lettuce, cabbage, celery and the like takes on the proportions of a major industry. Ranches of vast areas in these regions are frequently devoted to a single crop, and if the crop, for example, be lettuce, an immense quantity of the vegetable matures all at once and needs to be quickly harvested, packed and shipped.

When vegetables of the lettuce type are to be grown, packed and then shipped over long distances, the picking, packing and shipping must be accomplished with a high degree of efficiency if a profit is to be assured, in view of the many hazards which accompany the business of growing winter crops in warm climates for harvesting and shipment to cold climates during the winter season.

As a result of extreme labor shortages and the increasing high cost of employing skilled help in these agricultural areas, the necessity of providing and improving mechanical packing and shipping equipment has become of considerable importance.

It is, accordingly, among the objects of the invention to provide a new and improved vehicle for the transportation of packing equipment through fields where crops are grown by means of which strips of considerable width can be efficiently worked so that the crops growing therein may be readily loaded onto the vehicle and there immediately packed in suitable crates or other containers which may be immediately unloaded from the vehicle directly into trucks and carried to the shipping point.

Another object of the invention is to provide a new and improved vehicle to make possible the packing of lettuce, cabbage, celery and similar low growing vegetables in the field, which is sufficiently complete as to all of the necessary packing apparatus so that hauling of unpacked vegetables is substantially minimized, so that hauling of culls back to the ranch is eliminated and, furthermore, so that damage to partly grown vegetables is substantially minimized permitting them to continue their growth and be suitable at a later date for subsequent pickings and packings.

Still another object of the invention is to provide a new and improved vehicle for the transportation of packing equipment through the fields where low growing crops are grown for harvest which makes it possible to pick greater quantities of the crop during a time of day which is most advantageous and to pack and haul them to suitable shipping points while they are still in a condition most suitable for packing, icing and shipping.

Still further among the objects of the invention is to provide a new and improved vehicle for the transportation of packing equipment through fields of low growing row crops which is easy to manipulate through the furrows regardless of unevenness of the ground, which makes possible the harvesting and packing of the crop from a great many rows at one time, and which is so constructed that the wing portions of the vehicle normally spread wide during transportation through the fields can be folded into a compact arrangement enabling the vehicle to be drawn along the highway from one field to another.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figures 1 and 2 are diagrammatic representations of the vehicle, respectively, in spread open position for operation in a field and in folded or collapsed condition for transportation over a highway.

Figure 3 is an end view of the vehicle or apparatus when occupying an extended position for operation in the field.

Figure 4 is a top view of the center portion of the vehicle with the parts having the same relationship as illustrated in Figure 1.

Figure 5 is a longitudinal, sectional view taken on the line 5—5 of Figure 4.

Figure 6 is a cross-sectional view through the center portion of the device taken on the line 6—6 of Figure 5.

Figure 7 is a sectional view taken on the line 7—7 of Figure 5.

Figure 8 is a plan view of the outer end of one of the wings.

Figure 9 is a sectional view showing a locking device for wings in the positions shown in Figure 2.

In the drawings there is represented the apparatus described herein in diagrammatic form in Figures 1 and 2 primarily to show the arrangement inasmuch as the vehicle or apparatus is of such considerable size that details cannot be adequately shown in a drawing of the entire apparatus.

As illustrated in Figure 1, the vehicle in general comprises a trailer 10 having wings 12 and 14 adapted to be drawn either through the fields or down a highway by a tractor 16. As suggested in the diagrammatic form, the trailer ordinarily is equipped with four wheels 18 and the wings with one or more swivelly mounted wheels 19.

So that the wings may be folded upon the trailer into the positions illustrated in Figure 2, some form of what is currently known as a fifth wheel mounting 20 is employed. In the extended position of Figure 1 cables 21 extend from the tractor drawbar to the wings so that the wings when drawn are substantially stable and are prevented from possibility of folding back.

In the position shown in Figure 2 the cables 20 are released, the wings folded back, as there shown, and short cables 22 attached to the tractor are sufficient to draw the trailer and the collapsed wings along a highway of ordinary width.

An important element in the provision of a vehicle of this description is the joint or junction of the wings with the tractor. To be efficient the wings must have considerable breadth, in the neighborhood of ten to twenty feet, and the junction must not only be flexible to permit movement of the wings in both a horizontal and vertical direction but must also be particularly rugged in order that the vehicle may be capable of sustained use over rough ground.

Specifically, the wings are adapted to be carried by the trailer 10 which, as illustrated particularly in Figures 3, 5, 6 and 7, consists of a rectangular frame 25 having longitudinal elements 26 and transverse elements 27 connected together and braced in a manner well-known to the art. At each corner of the frame there is provided a wheel support 28 upon which is mounted the trailer wheel 18 of relatively large diameter and preferably equipped with a rubber tire 30.

On the upper surface or deck of the frame there is provided a stationary ring 31 securely attached to the frame in some suitable manner as by welding, riveting or bolts, details of which have been omitted for the sake of simplicity. The stationary ring 31 provides what may be designated as a track for a fifth wheel mounting.

Within the stationary ring 31 is a second ring 32 braced in one direction by a series of strips 33 comprising channels, angles or other suitable structural parts.

The second ring is herein illustrated as having mounted thereon a series of rollers 35 which are adapted to roll in the track formed by one leg of the structural part here shown as an angle bent to form the stationary ring 31. The second ring 32 is designed to be maintained in a rolling position upon the stationary ring by means of a shaft 36 which extends through concentric apertures 37 and 38, respectively, in the second ring and the frame 25. The shaft, as shown, is firmly anchored in place at the upper end and is free to rotate in the aperture 38, the weight of the machine being depended on to hold the parts in place.

Both of the wings 12 and 14 are adapted to be secured at one end to the second ring, thus permitting the trailer 10 to be steered to some extent. The location of the wings, however, in the extended position of Figure 1 is determined for the most part by pull upon the cables 20 and 22.

Inasmuch as the wings are counterparts of each other, a description of one wing only will suffice to disclose the manner of construction and operation of the apparatus.

As illustrated in considerable detail in Figures 5 and 6, it will be noted that the mounting for the wing 14, as well as the wing 12, consists of a pair of horizontally disposed pivots 40 keyed within a hinge block 41, the pivot in each case having an inwardly extending end 42 pivotally secured within a recess 43 in a pivot block 44.

The pivot block, in turn, has a downwardly extending annular flange 45 adapted to fit within an annular angle element 46, the annular angle element being rigidly attached to the second ring 32.

In order that the block 44 may be firmly anchored to the second ring, there is provided a pin 47 having a collar 48 at the upper end engaged within the block 44 and at the lower end secured in a bearing 50 which is anchored to the second ring as best shown in Figure 7. It will thus become apparent that the block 44 is adapted to pivot about the axis of the pin 47 as a center, the pin acting to prevent upward movement of the block 44.

Actually, the block 44 forms the sole means of connecting the wing to the second ring. By provision of the pin 47 the block is adapted to rotate in a horizontal plane, and the hinge block 41 is adapted to permit rotation of the wing up and down in a vertical plane about the axis of the pin 40.

By making it possible to tilt the wing up and down a slight amount about the axis of the pin 40, there is provided a certain flexibility in the wing location so that should either the tractor or the outer end of the wing pass over ground slightly higher or slightly lower at one end than the other the wing is permitted a certain freedom to tilt in order to accommodate the unevenness and thus eliminate strain at the connection between the wing and the trailer.

At the outer end of each wing there is provided a wheel support as illustrated in the drawing of the wing 14 in Figure 8. In this case two wheels 19 are shown each having a swivel mounting. In each case a fork 61 supports the wheel and has an upwardly extending shaft 62 which is journaled in a bracket 63. The wheels are much in the nature of caster wheels and rollers and are adapted to shift slightly from side to side in order to follow the furrow.

So that the wheels may not shift too far in either direction, stops 64, 65, 64' and 65' are provided which are adapted to be engaged by bosses 66 and 66' on the fork 61 and thereby stop swiveling of the wheel should it tend to turn too far. The general arrangement of the wheel support on the wing is aptly illustrated in Figures 3 and 8.

In extended positions the wings are carried in the relationship illustrated in Figure 1. This is also the relationship illustrated in Figure 5. To assist in connecting the cables 20, the wings are each provided with an eyelet 68 which are the means by which cables 20 are attached to the wings.

When the wings are to be folded into the position of Figure 2, a latch 70 may be applied to the then adjacent sides of the wings at a point remote from the platform of the trailer. Legs 71 and 72 overlie the frame elements of the wings and engage behind them. Bolts 73 may then be applied and a plug 74 used to maintain the wings in spaced apart relationship.

As the vehicle travels through the fields with the parts in the positions illustrated in Figure 1, heads of cabbages, lettuce or any other crop to the packing of which the apparatus may be adapted are cut and picked by pickers walking through the fields who then throw the vegetable into an elongated canvas trough 75. This trough is adapted to extend throughout the full width of each wing, and for the purpose of releasably holding the trough in position brackets 76 and 77 are secured, respectively, to uprights 78 and 79, and are shaped for the reception of pipes or tubes 80.

The wings are designed so that the packers may stand at various positions accessible to the canvas trough 75. For this purpose there is provided a catwalk, indicated generally by the reference character 85, consisting of suspended, rectangular, frame members 86 which support planks 87. In each wing the catwalk extends from the inside end adjacent the trailer throughout the length clear to the outside end.

Empty crates are carried upon the wings upon tracks 90 which are supported by L-shaped brackets 91, these brackets being supported upon the horizontal edge of the wing opposite from the location of the canvas trough 75. Upon the tracks are rollers 92 which permit empty crates 93 to roll lengthwise of the wing. So that the empty crates remain in position, fenders 94 and 95 are located upon the L-shaped brackets 91 and provided with suitable guides 96.

It should be borne in mind at this point that although each wing is an independent member, they are capable of being aligned so that the tracks 90 coincide with each other over the center of the trailer making it possible for empty crates to be loaded onto the outside end of either wing and rolled from one wing to the other whenever necessary.

An examination of Figure 8 will reveal that there are illustrated there what may be designated as two packing stations 97 and 97'. Similar packing stations extend in equally spaced relationship across both wings. At the outside end of the wing is located a crate truck 100 provided with a roller 101 at each corner adapted to roll along legs 102 of channels forming a track across the wing. This makes it possible to shift the truck endwise with relation to the wing.

A second crate truck 100' is similarly equipped and is located between stations 97 and 97'. It will become apparent from this that what have been termed stations 97 and 97' may shift depending upon where the packing is being done, the packers being privileged to walk along the catwalk and pull the truck which is being used with them along the track elements 102.

Each truck is provided with a set of rollers 103, these rollers being designed to support crates 93 while the crates are being packed. The rollers are made normally of sufficient length so that the crate may be positioned endwise with relation to the rollers. As many crate trucks may be provided as permitted by the length of the wings or the number of packers stationed thereon.

A packer located at one of the stations is enabled to lift an empty crate 93 from the track 90 and place it upon one of the trucks 100 nearest to him. Heads of lettuce or other vegetables deposited into the canvas trough 75 are then lifted from the trough and packed in the crate. A packer at any one of the stations may find it convenient to pack a crate on either side of the station.

When the crates are filled with lettuce or such other vegetable as may be harvested, they are shifted laterally over the rollers 103 to a position upon a track 105 also equipped with rollers 106. Full crates loaded upon the track 105 may be moved lengthwise with respect to the wings along the track to a position beneath a lidder 107 should the vehicle be provided with an apparatus of this kind. In the absence of mechanical lidders, lids may be applied to the crates by hand while they are stoll located upon the track 105.

Full crates are then moved along the track 105 toward the outside end of one of the wings where they may be immediately loaded upon motor trucks. Motor trucks for this purpose may be driven through the field where they can follow the progress of the packing vehicle. As fast as one motor truck is completely loaded with full crates it can be driven off to the shipping point and an empty truck can then be driven up to take its place. Motor trucks loaded with empty crates can be driven up to the end of the wing on the opposite side and can there follow the progress of the vehicle while empty crates are loaded from the motor truck onto the track 90.

Provision of a vehicle or apparatus of the type herein described, capable of being moved through large fields of growing crops, makes possible efficient harvesting of the crops. In the case of lettuce, which is grown in considerable quantities in the States of California and Arizona, plants 110 are usually planted two rows at a time between each pair of furrows 111, these furrows being customarily spaced about 80 inches apart. The wheels 18 of the trailer are, therefore, likewise spaced about 80 inches center to center so that they may travel along the rows. The spacing of the wheels 19 at the outer ends of the wings likewise takes into consideration the 80 inch spacing between furrows.

During the harvesting and packing of low growing vegetables such as lettuce, cutters or pickers normally precede the travel of the vehicle through the fields. These cutters cut the heads of lettuce and leave them stem up on the ground. Other pickers follow doing some cutting and also load the heads of lettuce into the canvas trough 75 on each wing.

Packers located at stations 97, 97', etc., then take the heads of lettuce from the trough and pack them in the empty crates which have been previously loaded onto the track 90. It will be apparent that packing may immediately follow cutting and that the heads of lettuce need not lay long on the ground.

Moreover, because of the entire packing equipment being transportable the packing equipment may be taken into the fields in the cool portions of the day, at early hours or even at night when conditions for packing are most advantageous. The heads of lettuce, for example, may be packed before the heat of the sun deprives them of coolness acquired during the night. The heads of lettuce thus promptly packed can be transported to shipping points where they can be loaded into cars for shipment and iced before losing the coolness acquired during the nighttime prior to cutting. This feature in itself is an important factor in preserving the freshness of the vegetable as well as reducing the amount of icing required.

The packing equipment herein described makes an improvement of exceptional importance in the dry packing of lettuce. The crisp, fresh heads directly from the field lend themselves particularly well to dry packing transportation, this being a type of refrigeration wherein pulverized ice is blown into a car after it is already packed with full crates.

The customary picking and packing procedure, which requires the cut heads of lettuce to lay long in the sun and consumes much time in hauling the then warm heads to a packing shed before packing can be completed, where circumvented by use of the apparatus herein described makes the apparatus one of exceptional value in the vegetable growing industry.

Since a field of lettuce or similar vegetable may need to be picked over two, three or four times during the course of a growing season, the vehicle may be taken on the field, run entirely over the field without damaging the growing crops, and then after the first cutting or picking has been packed the vehicle may be later re-run over portions of the field wherein additional growth has brought the remaining vegetables to a stage for cutting.

By reason of the flexible arrangement of the wings upon the trailer, the vehicle may be hauled readily from field to field when a second picking is not immediately needed. Hauling from field to field is made especially convenient by reason of the device being so designed that the wings can be folded up to the positions shown in Figure 2. This can be quickly accomplished by withdrawing the latch 70, shown in Figure 9, by merely releasing the bolts 73.

The wings may then be folded into their folded positions. A long radius 115 makes it possible to fold the wings close together. In folded positions the latch 70 may be reapplied between them at the location indicated by the reference character 116. In folded position the trailer may be readily steered, and because of the swivel character of the mounting of the wheels 19, the wheels are adapted to turn around and support the ends of the wings while they are being drawn down the highway.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. A packer for crops comprising a wheeled vehicle, elongated horizontal wings having one end of each pivotally secured to the vehicle, said wings having packing positions extended end to end laterally from the vehicle and wheeled supports adapted to support the wings in the furrows, said wings having inoperative parallel positions extending behind the vehicle adapted to facilitate transportation of the packer on a highway.

2. A harvester and packer for low growing crops comprising a trailer adapted to be hauled by a tractor, wheels on the trailer and a deck thereon, elongated horizontal harvesting and packing wings having one end of each pivotally secured to the deck, said wings having harvesting and packing positions extended end to end laterally from the trailer and wheeled supports adapted to support the ends of the wings remote from the trailer in the furrows, said wings having inoperative parallel positions extending behind the trailer wherein one end of each wing is supported by the trailer and the other end is supported by said wheeled supports for transportation of the harvester and packer on a highway.

3. A harvester for low growing crops comprising a wheeled vehicle adapted to move along crop furrows, said vehicle comprising a frame, a stationary ring on the frame, a second ring secured in and rotatably mounted relative to the first ring, a horizontally rotatable pivot on the second ring, and a wing frame located on the side of the vehicle, said wing frame having an attachment at one end to the pivot, a wheeled support adapted to travel in a furrow providing a mounting for the other end of the wing frame, said wing frame having a laterally extended operative position and having a position rotated about said rotatable pivot and extending behind the vehicle for travel on a highway.

4. A harvester for low growing crops comprising a vehicle adapted to move along crop furrows, said vehicle comprising a frame having wheels and a horizontal deck, a stationary ring on the deck, a second ring rotatably mounted in the first ring, horizontally rotatable pivots supported on the second ring on vertical axes, and a pair of wing frames located one on each side of the trailer, each said wing frame having an attachment at one end to the respective pivot, a wheeled support adapted to travel in a furrow providing a mounting for the other end of each wing frame, said attachment comprising an auxiliary pivot mounted upon a horizontal axis, said wing frames having laterally extended operative positions in end to end relationship at their adjacent ends and having positions rotated about said rotatable pivots to a parallel relationship extending behind the vehicle for travel on a highway.

5. A harvester for low growing crops comprising a trailer adapted to be drawn by a tractor along crop furrows, said trailer comprising a substantially rectangular frame having wheels at the corners and a horizontal deck, a stationary ring on the deck, a second ring rotatably mounted in the first ring and pivotally secured to the deck, horizontally rotatable pivots supported on the second ring on vertical axes, and a pair of wing frames located one on each side of the trailer, each said wing frame having an attachment at one end to the respective pivot, a wheeled support adapted to travel in a furrow providing a mounting for the other end of each wing frame, said attachment comprising an auxiliary pivot mounted upon a horizontal axis adapted to permit the outer end of the wing frame to raise and lower, said wing frames having laterally extended operative positions in end to end temporarily locked relationship at their adjacent ends and having positions rotated about said rotatable pivots to a parallel relationship extending behind the trailer for travel on a highway.

6. A harvester for low growing crops comprising a vehicle adapted to move along crop furrows, wings adapted to extend outwardly from the vehicle having pivotal attachments at the inner ends of said wings to the trailer, swivelly mounted rollers supporting outer ends of the wings in the furrows, said wings each having longitudinal empty crate conveyors, full crate conveyors independent of said empty crate conveyors and parallel thereto, conveying means adapted to shift crates in a direction transverse to the full crate conveyors and a catwalk adjacent the conveyors.

7. A harvester for low growing crops comprising a vehicle adapted to move along crop furrows, wings adapted to extend outwardly from the vehicle having pivotal attachments at the inner ends of said wings to the trailer, swivelly mounted rollers supporting outer ends of the wings in the furrows, said wings being adapted for pivotal movement in a horizontal plane about the vehicle to respectively parallel positions, said wings each having longitudinal empty crate conveyors extending the full length of said wings, full crate conveyors independent of said empty crate conveyors and parallel thereto, conveying means adapted to shift crates in a direction transverse to the full crate conveyors, and catwalks parallel to said wings positioned below said last conveyors and said conveying means and above the tops of growing crops.

8. A harvester for low growing crops comprising a vehicle adapted to move along crop furrows, wings adapted in one position to extend outwardly from the vehicle, said wings each having an attachment at the inner end to the vehicle, pairs of swivelly mounted rollers supporting outer ends of the wings adapted to traverse the furrows, said wings being adapted for pivotal movement in a horizontal plane about the trailer to respectively parallel positions, said wings each having a longitudinally disposed empty crate conveyor located at an upper level, a full crate conveyor therebeneath, a longitudinally disposed packing crate conveyor having trucks thereon, and a catwalk below said last conveyor and above the tops of growing crops.

9. A harvester for low growing crops comprising a trailer adapted to be drawn by a tractor along crop furrows, wings adapted in one position to extend outwardly from the trailer, said wings each having an attachment at the inner ends of said wings to the trailer incorporating both horizontally and vertically movable pivotal connections, pairs of swivelly mounted rollers supporting outer ends of the wings adapted to traverse the furrows in end to end alignment with each other, said wings being adapted for pivotal movement in a horizontal plane about the trailer to respectively parallel positions, said wings each having longitudinally disposed empty crate conveyors located at an upper level, full crate conveyors therebeneath, longitudinally disposed packing crate conveyors and trucks thereon, said trucks having crate rollers with the axes thereof parallel to the conveyors, catwalks beneath said last conveyors and above the tops of growing crops and crop hoppers adjacent said last conveyors.

CHARLES E. HUSTON.

REFERENCES CITED

The following references are of record in the file of this patent:

UNITED STATES PATENTS

| Number | Name | Date |
|---|---|---|
| 1,504,846 | Tarkington | Aug. 12, 1924 |
| 2,005,442 | Spiegl | June 18, 1935 |
| 2,169,521 | Chong | Aug. 15, 1939 |
| 2,267,234 | Garber | Dec. 23, 1941 |
| 2,321,387 | Jackson | June 8, 1943 |
| 2,357,549 | Roberson | Sept. 5, 1944 |
| 2,395,124 | Jelderks | Feb. 19, 1946 |